US010054074B2

(12) United States Patent
Nakano

(10) Patent No.: US 10,054,074 B2
(45) Date of Patent: Aug. 21, 2018

(54) DEVICE FOR DETERMINING ABNORMALITY IN ENGINE SYSTEM

(71) Applicant: HINO MOTORS, LTD., Tokyo (JP)

(72) Inventor: Hitoshi Nakano, Hino (JP)

(73) Assignee: HINO MOTORS, LTD., Tokyo (JP)

(*) Notice: Subject to any disclaimer, the term of this patent is extended or adjusted under 35 U.S.C. 154(b) by 0 days.

(21) Appl. No.: 15/122,523

(22) PCT Filed: Feb. 16, 2015

(86) PCT No.: PCT/JP2015/054094
§ 371 (c)(1),
(2) Date: Aug. 30, 2016

(87) PCT Pub. No.: WO2015/137047
PCT Pub. Date: Sep. 17, 2015

(65) Prior Publication Data
US 2017/0067405 A1 Mar. 9, 2017

(30) Foreign Application Priority Data

Mar. 10, 2014 (JP) ................... 2014-046276

(51) Int. Cl.
G01M 17/00 (2006.01)
G06F 7/00 (2006.01)
(Continued)

(52) U.S. Cl.
CPC ......... F02D 41/222 (2013.01); F02D 41/123 (2013.01); F02D 41/1456 (2013.01);
(Continued)

(58) Field of Classification Search
CPC . G01M 15/104; G01M 15/11; F02D 2200/04; F02D 2200/0611;
(Continued)

(56) References Cited

U.S. PATENT DOCUMENTS 5,158,059 A * 10/1992 Kuroda ................. F01N 11/002
123/479
5,452,604 A * 9/1995 Namiki ................. G01M 15/11
123/436
(Continued)

FOREIGN PATENT DOCUMENTS

| EP | 0603543 A | 6/1994 |
| JP | H04112950 A | 4/1992 |
| JP | H10212999 A | 8/1998 |
| JP | 2008095615 A | 4/2008 |
| JP | 2010112211 A | 5/2010 |

OTHER PUBLICATIONS

English translation of the International Preliminary Report on Patentability corresponding to PCT/JP2015/054094 dated Sep. 13, 2015.
(Continued)

Primary Examiner — Harry Y Oh
(74) Attorney, Agent, or Firm — Kilpatrick Townsend & Stockton

(57) ABSTRACT

An estimation unit calculates an estimated value of oxygen concentration in an exhaust passage on the basis of a target injection amount of a fuel injection valve and an air intake amount of an engine. A first determination unit determines the relationship of a detected value to the estimated value of the oxygen concentration, in both a fuel-injecting state and a non-fuel-injecting state. For each of a plurality of cylinders, a second determination unit acquires crankshaft angular acceleration during the expansion strokes of the cylinders in the fuel-injecting state, and determines the relationship of each angular acceleration to the average value of all of the angular accelerations. An abnormality determination unit determines whether or not there is an abnormality in an engine system on the basis of the determination results of the first and second determination units.

7 Claims, 5 Drawing Sheets

(51) Int. Cl.
*G06F 11/30* (2006.01)
*G06F 19/00* (2018.01)
*G07C 5/00* (2006.01)
*F02D 41/22* (2006.01)
*G01M 15/10* (2006.01)
*G01M 15/11* (2006.01)
*F02D 41/12* (2006.01)
*F02D 41/14* (2006.01)
*F02D 41/00* (2006.01)

(52) U.S. Cl.
CPC ..... *F02D 41/1458* (2013.01); *F02D 41/1495* (2013.01); *F02D 41/1497* (2013.01); *F02D 41/22* (2013.01); *F02D 41/221* (2013.01); *G01M 15/104* (2013.01); *G01M 15/11* (2013.01); *F02D 41/0085* (2013.01); *F02D 2200/04* (2013.01); *F02D 2200/0611* (2013.01); *F02D 2200/101* (2013.01); *F02D 2200/1002* (2013.01); *F02D 2200/1012* (2013.01)

(58) Field of Classification Search
CPC ....... F02D 2200/1002; F02D 2200/101; F02D 2200/1012; F02D 41/0085; F02D 41/123; F02D 41/1456; F02D 41/1458; F02D 41/1495; F02D 41/1497; F02D 41/22; F02D 41/221; F02D 41/222
See application file for complete search history.

(56) References Cited

U.S. PATENT DOCUMENTS

| | | | | |
|---|---|---|---|---|
| 5,506,778 | A * | 4/1996 | Matsumoto | F02D 41/1498 701/111 |
| 5,587,909 | A * | 12/1996 | Matsumoto | G01L 19/147 701/111 |
| 5,808,186 | A * | 9/1998 | Matsumoto | F02D 41/1498 73/114.03 |
| 2003/0197511 | A1* | 10/2003 | Takahashi | F02P 17/12 324/399 |
| 2010/0268433 | A1* | 10/2010 | Ueda | F02D 31/001 701/102 |
| 2011/0029218 | A1* | 2/2011 | Nakagawa | F02D 41/0085 701/103 |
| 2011/0083423 | A1* | 4/2011 | Kadowaki | F02D 41/0002 60/276 |
| 2011/0192146 | A1* | 8/2011 | Sugimoto | F02D 41/0085 60/276 |

OTHER PUBLICATIONS

English translation of the International Search Report corresponding to PCT/JP2015/064094 dated Apr. 7, 2015.
Extended European Search Report corresponding to European Application No. 15761925.5-10603, dated Sep. 20, 2017, 9 pages.

* cited by examiner

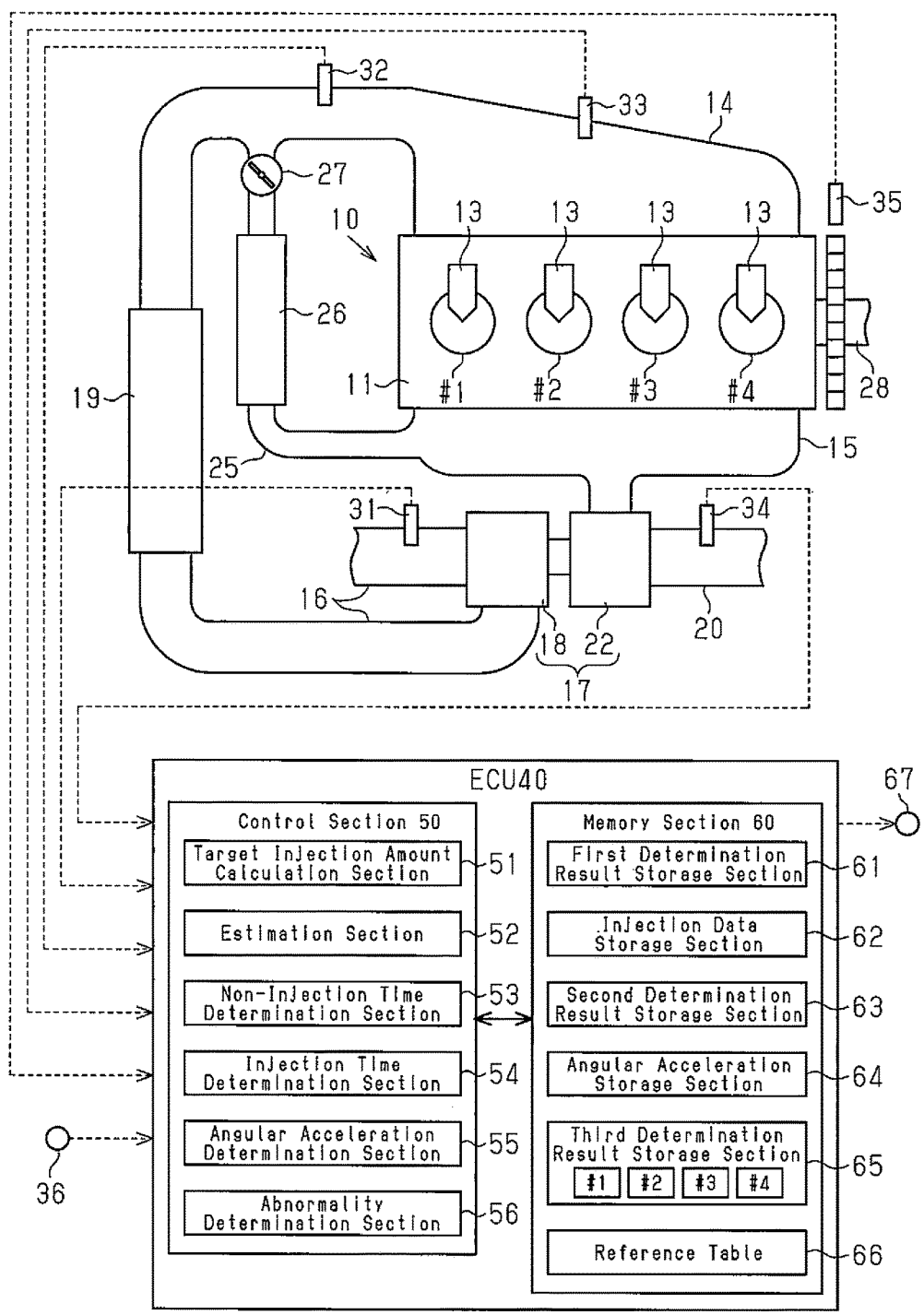

Fig.2

| State \ Determination target | First determination result | Second determination result | Third determination result |
|---|---|---|---|
| Normal | Normal | Normal | Normal |
| Sensor characteristic abnormality (high) | High | High | Normal |
| Sensor characteristic abnormality (low) | Low | Low | Normal |
| All-cylinder injection characteristic abnormality (large) | Normal | Low | Normal |
| All-cylinder injection characteristic abnormality (small) | Normal | High | Normal |
| Specific cylinder injection characteristic abnormality (large) | Low | Low | Including High |
| Specific cylinder injection characteristic abnormality (small) | High | High | Including Low |
| Specific cylinder misfire | Normal | High | Including Low |

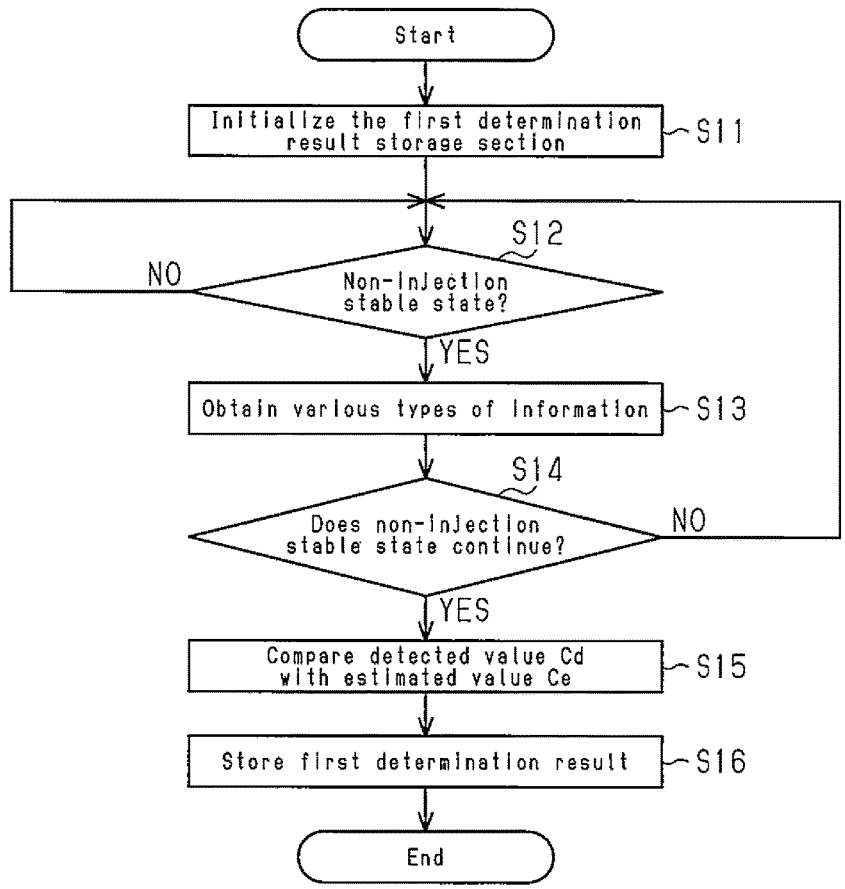

Fig.3

DEVICE FOR DETERMINING ABNORMALITY IN ENGINE SYSTEM

TECHNICAL FIELD

The present disclosure relates to a device for determining abnormality in an engine system.

BACKGROUND ART

Conventional engine systems include devices for determining abnormality, which determine the presence or absence of abnormality in the engine systems. For example, Patent Document 1 discloses a device for determining abnormality, which detects misfires in the engine and abnormality of a fuel injection valve for injecting fuel based on a fuel injection amount and a fluctuation in the engine rotation speed in an idling state.

PRIOR ART DOCUMENT

Patent Document

Patent Document 1: Japanese Laid-Open Patent Publication No. 2010-112211

SUMMARY OF THE INVENTION

Problem that the Invention is to Solve

Abnormalities in the engine systems, which include the aforementioned misfires in the engine and abnormalities of the fuel injection valves, happens more often in a traveling state than in an idling state. Thus, it is desirable for a device that determines abnormality in the engine system to detect abnormality in the engine system in the traveling state not in the idling state.

It is an objective of the present disclosure to provide a device for detecting abnormality in the engine system that is capable of detecting the presence or absence of abnormality in the engine system during traveling of the vehicle.

Means for Solving the Problems

In one embodiment of the present disclosure, a device for determining the presence or absence of abnormality in an engine system is provided. The engine system includes an engine that has a plurality of cylinders and drives a crankshaft, a fuel injection valve that is arranged in each of the cylinders and injects fuel into the cylinder, and a sensor that outputs a detected value of residual oxygen concentration, which is the oxygen concentration in an exhaust passage. The abnormality includes at least one of abnormality in the sensor, abnormality in the fuel injection valves, and misfires in the engine. The device includes: an estimation section for calculating an estimated value of the residual oxygen concentration based on a target injection amount for the fuel injection valves and an intake air amount of the engine; a first determination section for determining the relationship between the detected value and the estimated value separately in a non-fuel-injecting state and in a fuel-injecting state, where the relationship includes whether the detected value is higher than the estimated value, whether the detected value is lower than the estimated value and whether the detected value is equal to the estimated value; a second determination section that obtains, for each cylinder, an angular acceleration of the crankshaft in an expansion stroke of the cylinder in the fuel-injecting state and determines, for each cylinder, the relationship between the corresponding angular acceleration and an average angular acceleration, which is an average of all of the angular accelerations, where the relationship includes whether each angular acceleration is higher than the average angular acceleration, whether each angular acceleration is lower than the average angular acceleration, and whether each angular acceleration is equal to the average angular acceleration; and an abnormality determination section for determining the presence or absence of abnormality based on a determination result of the first determination section and a determination result of the second determination section.

BRIEF DESCRIPTION OF THE DRAWINGS

FIG. 1 is a schematic diagram of a device for determining abnormality according to one embodiment of the present disclosure with an engine system including the device.

FIG. 2 is a table that shows the relationship between the states of the engine system and determination results by the device for determining abnormality of FIG. 1.

FIG. 3 is a flowchart that shows one example of a non-injection time determination process by the device for determining abnormality of FIG. 1.

EMBODIMENTS OF THE INVENTION

Figure 4:
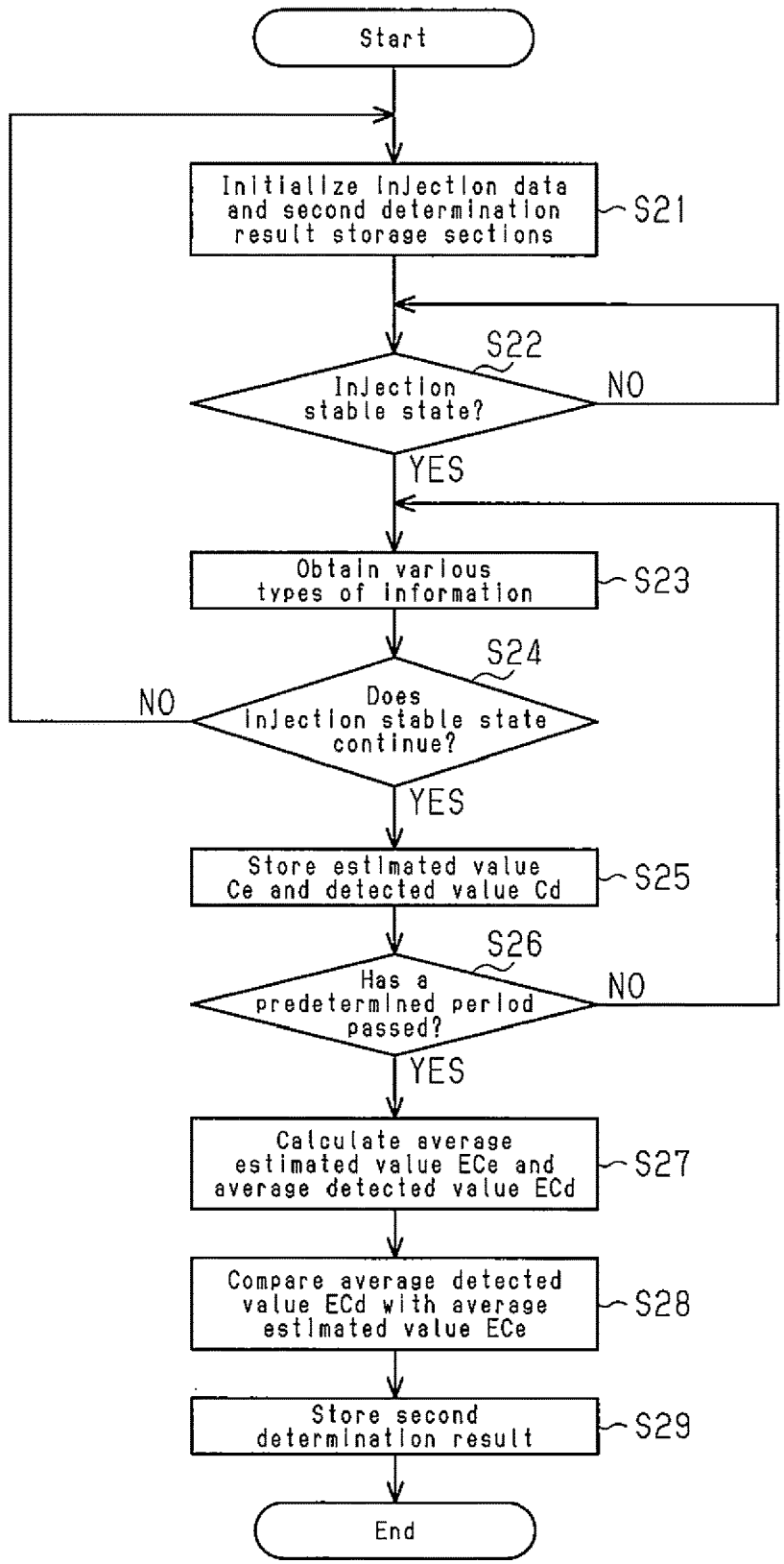
FIG. 4 is a flowchart that shows one example of an injection time determination process by the device for determining abnormality of FIG. 1.

A device for determining abnormality in an engine system according to one embodiment of the present disclosure will now be described with reference to FIGS. 1 to 6.

As shown in FIG. 1, the engine system includes a diesel engine 10 (hereinafter, referred to simply as the engine 10). The engine 10 has a cylinder block 11 including first to fourth cylinders #1, #2, #3, and #4. Each cylinder has a fuel injection valve 13, from which fuel is injected into the cylinder. An intake manifold 14 for supplying operation gas to each cylinder and an exhaust manifold 15, into which exhaust gas from each cylinder flows, are coupled to the cylinder block 11.

An intake passage 16 is coupled to the intake manifold 14, and intake air is introduced to the intake passage 16 through an air cleaner (not shown). The intake air is cooled by an intercooler 19 after being pressurized by the compressor 18 of a turbo charger 17.

An exhaust passage 20 is coupled to the exhaust manifold 15, and a turbine 22, which constitutes the turbo charger 17, is arranged on the exhaust passage 20. An EGR passage 25 is coupled to the exhaust manifold 15. The EGR passage 25 is coupled to the intake passage 16 and introduces some of the exhaust gas as EGR gas to the intake passage 16. An EGR cooler 26 for cooling EGR gas and an EGR valve 27, of which the open degree is controlled according to the operating state of the engine 10, are attached to the EGR passage 25. When the EGR valve 27 is in an open state, operation gas, which is mixed gas of exhaust gas and intake air, is supplied to each cylinder.

The engine system includes various types of sensors that detect information related to the operating state of the engine 10. An intake air amount sensor 31, which detects an intake air amount QA, is arranged upstream of the compressor 18. A boost pressure sensor 32 for detecting boost pressure PB and an intake air temperature sensor 33 for detecting intake air temperature TIN, which is the temperature of operation gas in the intake manifold 14, are arranged downstream of the connection between the intake passage 16 and the EGR passage 25. An oxygen concentration sensor 34 is arranged downstream of the turbine 22 and detects a residual oxygen concentration, which is the weight concentration of oxygen in the fluid flowing through the exhaust passage 20. In addition to these, the engine system includes a crank angle sensor 35 for detecting the crank angle of a crankshaft 28 and an accelerator sensor 36 for detecting an acceleration open degree ACC.

The presence or absence of abnormality in the engine system is determined by an ECU 40, which is a device for determining abnormality. The ECU 40 determines the presence or absence of abnormality in the engine system based on detection signals from the aforementioned sensors. In particular, the abnormality includes misfires in the engine 10, abnormality in the injection characteristic of the fuel injection valve 13, and abnormality in the detection characteristic of the oxygen concentration sensor 34.

The ECU 40 includes a microcomputer having a central processing unit (CPU), a non-volatile memory (ROM), and a volatile memory (RAM). The ECU 40 includes a control section 50 for executing various types of processes and a memory section 60 for storing various types of control programs and various types of data.

The control section 50 includes a target injection amount calculation section 51, which figures out a cylinder into which fuel is injected and calculates a target injection amount QF, which is a target amount of fuel injected from the fuel injection valve 13 corresponding to the cylinder, e.g., based on a detection signal from the crank angle sensor 35 and the acceleration open degree ACC.

The control section 50 includes an estimation section 52, which calculates the estimated value Ce of residual oxygen concentration. The estimation section 52 calculates the oxygen concentration (weight concentration) in air as the estimated value Ce when the target injection amount QF is less than or equal to zero. The estimation section 52 calculates the estimated value Ce based on the target injection amount QF and the intake air amount QA when the target injection amount QF is greater than zero. The estimation section 52 calculates the estimated value Ce by assigning the injection weight based on the target injection amount QF and the air weight based on the intake air amount QA to the following formula (1). The formula (1) is a model defined based on the results of various types of experiments conducted in the engine system. The introduced amount of EGR gas and the like may be considered in a model for estimating the estimated value Ce.

[Formula 1]

$$\text{estimated value } Ce = \left(\frac{\text{air weight}}{\text{injection weight}} - \text{stoichiometric mixture ratio}\right) \times \frac{\text{injection weight} \times \text{oxygen concentration in air}}{\text{air weight}} \quad \text{Formula (1)}$$

The control section 50 includes a non-injection time determination section 53, which constitutes a first determination section. The non-injection time determination section 53 executes a non-injection time determination process that determines the high-low relationship between the detected value Cd and the estimated value Ce in the non-fuel-injecting state and stores the determination result in the first determination result storage section 61 of the memory section 60.

The non-injection time determination section 53 starts the non-injection time determination process when the engine 10 is started and normality is determined in the abnormality determination process, which will be described later. The non-injection time determination section 53 initializes the first determination result storage section 61 when the non-injection time determination process is started. The non-injection time determination section 53 determines that the engine 10 is in a non-injection stable state when a state in which the target injection amount QF is less than or equal to zero continues for a predetermined period. In the non-injection stable state subsequent to the determination, the non-injection time determination section 53 obtains the oxygen concentration (weight concentration) in air as the estimated value Ce and obtains the detected value Cd based on the detection signal of the oxygen concentration sensor 34. The non-injection time determination section 53 determines the high-low relationship between the detected value Cd and the estimated value Ce based on the divergence degree of the detected value Cd relative to the estimated value Ce. In the non-injection time determination process, the non-injection time determination section 53 obtains "High," with which it is determined that the detected value Cd is higher than the estimated value Ce, "Low," with which it is determined that the detected value Cd is lower than the estimated value Ce, or "Normal," with which it is determined that the detected value Cd is equal to the estimated value Ce, as a first determination result. The divergence degree when it is determined that the detected value Cd is higher than the estimated value Ce, the divergence degree when it is determined that the detected value Cd is equal to the estimated value Ce, and the divergence degree when it is determined that the detected value Cd is lower than the estimated value Ce are individually set based on the results of the various types of experiments conducted for the engine system.

The control section 50 includes an injection time determination section 54, which constitutes the first determination section. The injection time determination section 54 executes an injection time determination process, which determines the high-low relationship between the detected value Cd and the estimated value Ce in a fuel-injecting state and stores the determination result in the second determination result storage section 63 of the memory section 60.

The injection time determination section 54 starts the injection time determination process when the engine 10 is started and normality is determined in the abnormality determination process, which will be described later. The injection time determination section 54 initializes an injection data storage section 62 and a second determination result storage section 63 when the injection time determination process is started. The injection time determination section 54 determines that the engine 10 is in an injection stable state when a state in which the derivative value of a target injection amount QF, which is the deviation between two sequential target injection amounts QF, is less than or equal to a predetermined value continues for a predetermined period. During a predetermined period of the injection stable state subsequent to the determination, the injection time determination section 54 calculates estimated values Ce, obtains detected values Cd, and stores these estimated values Ce and detected values Cd in the injection data storage section 62 of the memory section 60.

When the predetermined period has passed, the injection time determination section 54 calculates an average estimated value ECe, which is the average of the estimated values Ce stored in the injection data storage section 62, and an average detected value ECd, which is the average of the detected values Cd stored in the injection data storage section 62. The injection time determination section 54 compares the average detected value ECd with the average estimated value ECe and determines the high-low relationship between the average detected value ECd and the average estimated value ECe based on the divergence degree of the average detected value ECd relative to the average estimated value ECe. In the injection time determination process, the injection time determination section 54 obtains "High," with which it is determined that the average detected value ECd is higher than the average estimated value ECe, "Low," with which it is determined that the average detected value ECd is lower than the average estimated value ECe, or "normal," with which it is determined that the average detected value ECd is equal to the average estimated value ECe as a second determination result. The divergence degree when it is determined that the average detected value ECd is higher than the average estimated value ECe, the divergence degree when it is determined that the average detected value ECd is equal to the average estimated value ECe, and the divergence degree when it is determined that the average detected value ECd is lower than the average estimated value ECe are individually set based on the results of the various types of experiments conducted for the engine system.

The control section 50 includes an angular acceleration determination section 55, which is a second determination section. The angular acceleration determination section 55 obtains individual cylinder angular accelerations a1, a2, a3, and a4, each of which is the angular acceleration of the crankshaft 28 in an expansion stroke of the corresponding cylinder based on the detection signal of the crank angle sensor 35. The angular acceleration determination section 55 executes an angular acceleration determination process, which determines the high-low relationship between each of the individual cylinder angular accelerations a1 to a4 and an all-cylinder angular acceleration Ea, which is the average of the individual cylinder angular accelerations a1 to a4, and stores the determination result in the third determination result storage section 65 of the memory section 60.

In particular, the angular acceleration determination section 55 starts the angular acceleration determination process when the engine 10 is started and normality is determined in the abnormality determination process, which will be described later. The angular acceleration determination section 55 initializes an angular acceleration storage section 64 and a third determination result storage section 65 when the angular acceleration determination process is started. The angular acceleration determination section 55 determines whether the engine 10 is in a steady state. The angular acceleration determination section 55 determines that the engine 10 is in the steady state when both of the following conditions are continuously satisfied for a predetermined period. One of the conditions is that the derivative value of an engine rotation speed Ne based on the detection signal of the crank angle sensor 35 is less than or equal to a predetermined value. The other is that the derivative value of the target injection amount QF is less than or equal to a predetermined value.

During a predetermined period of the steady state subsequent to the determination, the angular acceleration determination section 55 repeatedly calculates the angular acceleration of the crankshaft 28 in the expansion stroke of each cylinder based on the detection signal of the crank angle sensor 35 and stores the calculated angular acceleration in the angular acceleration storage section 64 of the memory section 60. The angular acceleration storage section 64 has an area that stores the angular acceleration for each cylinder. When the predetermined period has passed, the angular acceleration determination section 55 calculates the individual cylinder angular acceleration a1 (a2, a3, a4) for each cylinder based on the angular accelerations of the cylinder, which are stored in the angular acceleration storage section 64. In other words, each of the angular accelerations a1 to a4 is the average of the angular accelerations for the corresponding cylinder, which are repeatedly calculated and stored during the predetermined period. In addition, the angular acceleration determination section 55 calculates the average of the individual cylinder angular accelerations a1 to a4 as an all-cylinder angular acceleration Ea.

The angular acceleration determination section 55 compares each of the individual cylinder angular accelerations a1 to a4 with the all-cylinder angular acceleration Ea, determines, for each cylinder, the high-low relationship between the individual cylinder angular acceleration and the all-cylinder angular acceleration Ea based on the divergence degree of the individual cylinder angular acceleration a1 (a2, a3, a4) relative to the all-cylinder angular acceleration Ea, and stores the determination result in a third determination result storage section 65 of the memory section 60. In the angular acceleration determination process, the angular acceleration determination section 55 obtains, for each cylinder, "High," with which it is determined that the individual cylinder angular acceleration is higher than the all-cylinder angular acceleration Ea, "Low," with which it is determined that the individual cylinder angular acceleration is lower than the all-cylinder angular acceleration Ea, or "Normal," with which it is determined that the individual cylinder angular acceleration is equal to the all-cylinder angular acceleration Ea, as a third determination result. The divergence degree when it is determined that the individual cylinder angular acceleration is higher than the all-cylinder angular acceleration, the divergence degree when it is determined that the individual cylinder angular acceleration is equal to the all-cylinder angular acceleration, and the divergence degree when it is determined that the individual cylinder angular acceleration is lower than the all-cylinder angular acceleration are individually set based on the results of the various types of experiments conducted for the engine system.

The control section 50 includes an abnormality determination section 56, which executes the abnormality determination process, which determines the presence or absence of abnormality and identifies its abnormality location in the engine system based on the determination results stored in the determination result storage sections 61, 63, and 65 and a reference table 66 pre-stored in the memory section 60. The abnormality determination process starts from the start of the engine 10 and finishes at the abnormality determination of the engine system.

The reference table 66 is data in which the first to third determination results are associated with the state of the engine system. When all of the first to third determination results are "Normal," the abnormality determination section 56 determines that the engine system is normal. When at least one of the first to third determination results is abnormal, the abnormality determination section 56 determines that the engine system is abnormal.

As shown in FIG. 2, when the first determination result and the second determination result are "High" and the third determination result is "Normal," sensor characteristic abnormality (high) is occurring, which is a state in which the detected value Cd of the oxygen concentration sensor 34 is higher than the actual value.

When the first determination result and the second determination result are "Low" and the third determination result is "Normal," sensor characteristic abnormality (low) is occurring, which is a state in which the detected value Cd of the oxygen concentration sensor 34 is lower than the actual value.

When the first determination result and the third determination result are "Normal" and the second determination result is "Low," all-cylinder injection characteristic abnormality (large) is occurring, which is a state in which fuel injected in each fuel injection valve 13 is more than the target injection amount QF.

When the first determination result and the third determination result are "Normal" and the second determination result is "High," all-cylinder injection characteristic abnormality (small) is occurring, which is a state in which fuel injected from each fuel injection valve 13 is less than the target injection amount QF.

When the first determination result and the second determination result are "Low" and "High" is included in the third determination result, specific cylinder injection characteristic abnormality (large) is occurring, which is a state in which fuel injected from the fuel injection valve 13 of the cylinder corresponding to "High" is larger than the target injection amount QF.

When the first determination result and the second determination result are "High" and "Low" is included in the third determination result, specific cylinder injection characteristic abnormality (small) is occurring, which is a state in which fuel injected from the fuel injection valve 13 of the cylinder corresponding to "Low" is smaller than the target injection amount QF.

When the first determination result is "Normal," the second determination result is "High," and "Low" is included in the third determination result, specific cylinder misfire is occurring, which is a state in which a misfire is occurring in the cylinder corresponding to "Low." In contrast, when multiple results of "Low" are included in the third determination result, multiple cylinder misfire is occurring, which is a state in which a misfire is occurring in multiple cylinders.

When concluding the abnormality determination for the engine system, the abnormality determination section 56 turns on an alarm lamp 67 to notify the driver of the occurrence of abnormality in the engine system and memorizes the state of the abnormality in a predetermined area of the memory section 60.

One example of the non-injection time determination process will now be described with reference to FIG. 3.

As shown in FIG. 3, the ECU 40 first initializes the first determination result storage section 61 (step S11). Next, the ECU 40 determines whether the current state is a non-injection stable state (step S12). When the non-injection stable state is denied (step S12: NO), the ECU 40 repeatedly determines whether the current state is the non-injection stable state.

When the non-injection stable state is confirmed (step S12: YES), the ECU 40 obtains various types of information including the detected value Cd and the calculated target injection amount QF (step S13). The ECU 40 determines whether the non-injection stable state still continues based on the information (step S14). When the non-injection stable state does not continue (step S14: NO), the ECU 40 shifts to the process at step S12 again. When the non-injection stable state continues (step S14: YES), the ECU 40 compares the detected value Cd with the oxygen concentration in air as the estimated value Ce (step S15). The ECU 40 stores the comparison result at step S15 as the first determination result in the first determination result storage section 61 (step S16) and finishes the non-injection time determination process.

One example of the injection time determination process will now be described with reference to FIG. 4.

As shown in FIG. 4, the ECU 40 first initializes the injection data storage section 62 and the second determination result storage section 63 (step S21). Next, the ECU 40 determines whether the current state is the injection stable state (step S22). When the injection stable state is denied (step S22: NO), the ECU 40 repeatedly determines whether the current state is the injection stable state.

When the injection stable state is confirmed (step S22: YES), the ECU 40 obtains various types of information including the intake air amount QA, the detected value Cd, and the calculated target injection amount QF (step S23). The ECU 40 determines whether the injection stable state continues based on the information (step S24). When the injection stable state is denied (step S24: NO), the ECU 40 shifts to the process at step S21 again. When the injection stable state continues (step S24: YES), the ECU 40 calculates the estimated value Ce by assigning the injection weight based on the target injection amount QF and the air weight based on the intake air amount QA to the formula (1), and stores the calculated estimated value Ce and the detected value Cd obtained at step S23 in the injection data storage section 62 (step S25).

Next, the ECU 40 determines whether a predetermined period has passed in the injection stable state after the injection stable state is determined at step S22 (step S26). When the predetermined period has not passed in the injection stable state (step S26: NO), the ECU 40 shifts to the process at step S23 again. When the predetermined period has passed in the injection stable state (step S26: YES), the ECU 40 calculates the average estimated value ECe and the average detected value ECd based on the estimated values Ce and the detected values Cd, which are stored in the injection data storage section 62 (step S27). The ECU 40 compares the average detected value ECd with the average estimated value ECe (step S28), stores the comparison result as the second determination result in the second determination result storage section 63 (step S29), and finishes the injection time determination process.

One example of the angular acceleration determination process will now be described with reference to FIG. 5.

Figure 5:
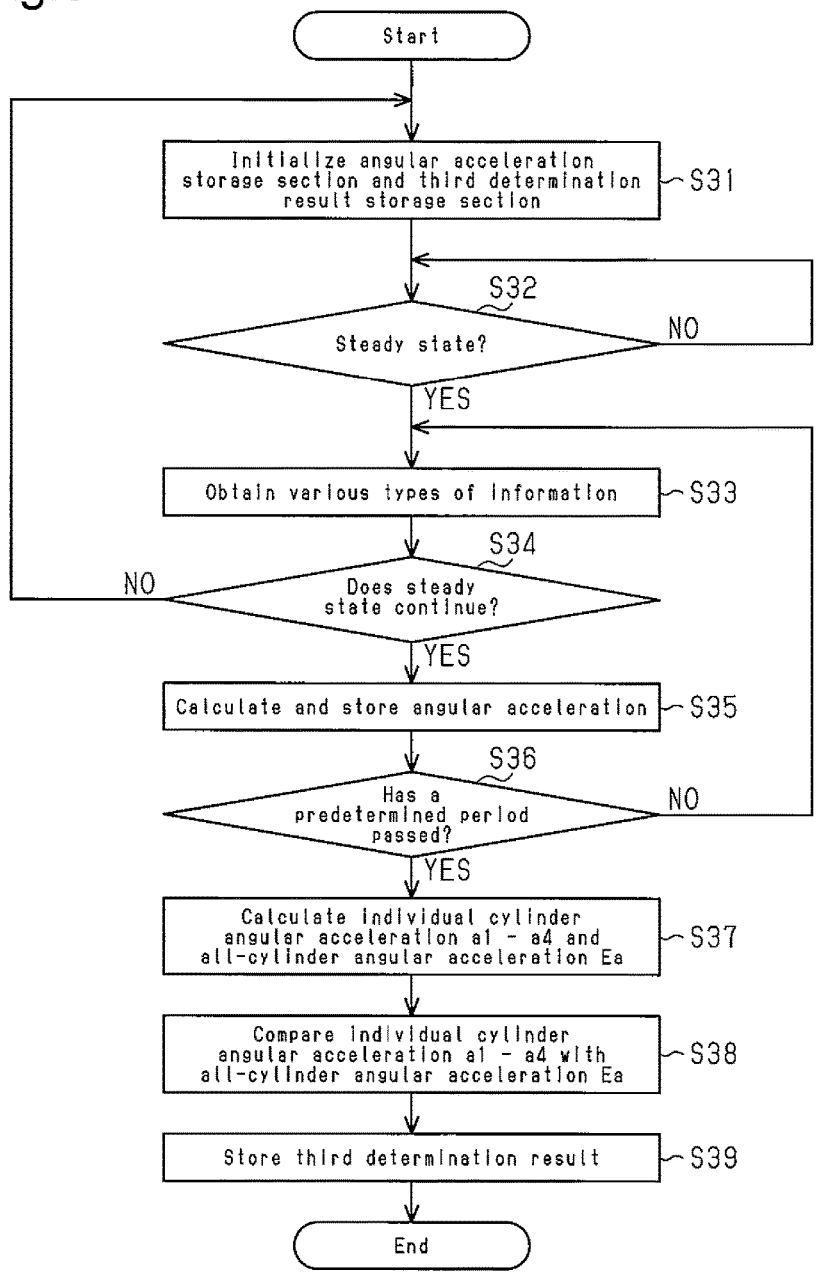
FIG. 5 is a flowchart that shows one example of an angular acceleration determination process by the device for determining abnormality of FIG. 1.

As shown in FIG. 5, the ECU 40 first initializes the angular acceleration storage section 64 and the third determination result storage section 65 (step S31). Next, the ECU 40 determines whether the engine 10 is in the steady state (step S32). When the engine 10 is not in the steady state (step S32: NO), the ECU 40 repeatedly determines whether the engine 10 is in the steady state.

When the engine 10 is in the steady state (step S32: YES), the ECU 40 obtains various types of information including the engine rotation speed Ne, a cylinder which fuel is injected into, and the calculated target injection amount QF (step S33). The ECU 40 determines whether the steady state continues based on the information (step S34). When the steady state does not continue (step S34: NO), the ECU 40 shifts to the process at step S31 again. When the steady state continues (step S34: YES), the ECU 40 calculates the angular acceleration of the cylinder into which fuel is injected based on the detection signal of the crank angle sensor 35 and stores the calculated angular acceleration in the angular acceleration storage section 64 (step S35).

Next, the ECU 40 determines whether a predetermined period has passed after it was determined that the engine 10 was in the steady state at step S32. When the predetermined period has not passed (step S36: NO), the ECU 40 shifts to the process at step S33 again. When the predetermined period has passed (step S36: YES), the ECU 40 calculates the individual cylinder angular accelerations a1 to a4 and the all-cylinder angular acceleration Ea based on the angular accelerations stored in the angular acceleration storage section 64 (step S37). The ECU 40 compares each individual cylinder angular acceleration a1 (a2, a3, a4) with the all-cylinder angular acceleration Ea (step S38), stores the comparison result as the third determination result in the third determination result storage section 65 (step S39), and finishes the angular acceleration determination process.

One example of the abnormality determination process will now be described with reference to FIG. 6.

Figure 6:
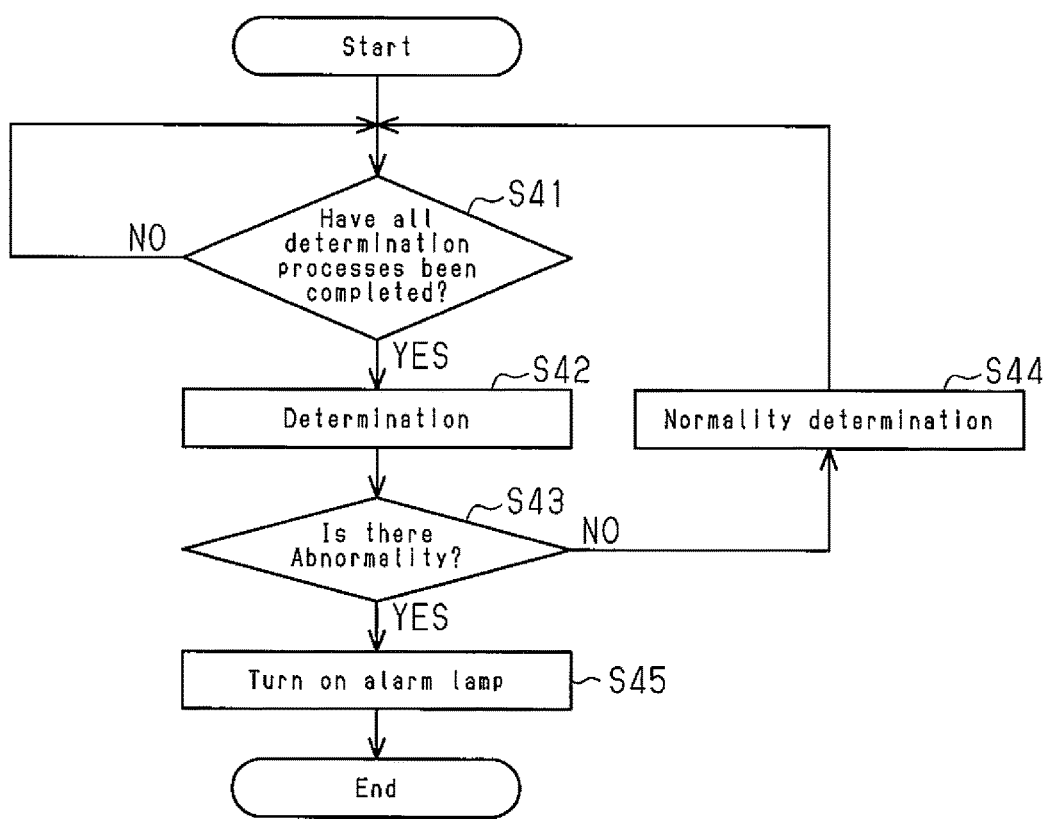
FIG. 6 is a flowchart that shows one example of an abnormality determination process by the device for determining abnormality of FIG. 1.

As shown in FIG. 6, the ECU 40 first determines whether all the non-injection time determination process, the injection time determination process, and the angular acceleration determination process have been completed (step S41). When all of the determination processes have not been completed (step S41: NO), the ECU 40 repeatedly determines whether all of the determination processes have been completed.

When all of the determination processes have been completed (step S41: YES), the ECU 40 determines the presence or absence of abnormality and identifies its abnormality location in the engine system based on the determination results of the determination processes stored in the memory section 60 and the reference table 66 (step S42). When abnormality is not detected in the engine system at step S42 (step S43: NO), the ECU 40 determines normality (step S44) and after that, shifts to the process at step S41 again. When abnormality is detected in the engine system (step S43: YES), the ECU 40 turns on the alarm lamp 67 (step S45) and finishes the abnormality determination process.

Operation of the device for determining abnormality will now be described.

The ECU 40 determines abnormality of the oxygen concentration sensor 34, abnormality of the fuel injection valve 13, and misfires in the engine 10 based on various types of information that is obtained when the engine 10 is in the non-injection stable state, the injection stable state, or the steady state. The non-injection stable state is an operating state embodied in a state in which the accelerator pedal is not depressed during traveling of the vehicle. The fuel-injecting state is an operating state embodied in a state in which the accelerator pedal is depressed during traveling of the vehicle. In other words, the non-injection stable state, the injection stable state, the steady state are operating states embodied during traveling of the vehicle. As a result, even during traveling of the vehicle, it is possible to determine the presence or absence of abnormality in the engine system.

The device for determining abnormality according to the above-illustrated embodiment achieves the following advantages.

(1) It is possible to determine the presence or absence of abnormality in the engine system during traveling of the vehicle.

(2) Determination in the non-injection stable state is conducted with the estimated value Ce and the detected value Cd in the non-fuel-injecting state. Thus, the detected value Cd used in determination in the non-fuel-injecting state is not significantly influenced by exhaust gas discharged from the engine 10 immediately before sifting to the non-fuel-injecting state. As a result, reliability in the determination result of the non-injection time determination section 53 is improved, and reliability in the determination result of the abnormality determination section 56 is improved.

(3) Determination in the fuel-injecting state is conducted based on the estimated value Ce and the detected value Cd in the injection stable state. Thus, the fluctuations of the target injection amount and the intake air amount, i.e., the fluctuation of the fuel injection amount, are not large, so that determination in fuel-injecting state is conducted based on the estimated value Ce and the detected value Cd while the operating state of the engine 10 is stable. As a result, reliability in the determination result of the injection time determination section 54 is improved, and reliability in the determination result of the abnormality determination section 56 is improved.

(4) Determination by the injection time determination section 54 is conducted based on the average estimated value ECe and the average detected value ECd. Thus, reliability in the determination result of the injection time determination section 54 is further improved.

(5) The individual cylinder angular accelerations a1 to a4 are calculated from angular accelerations in the steady state of the engine 10, i.e., a state in which the rotation of the crankshaft 28 is stable. In other words, the individual cylinder angular accelerations a1 to a4 are angular accelerations in the fuel-injecting state and in a state in which fluctuation in the angular acceleration of the crankshaft 28 is small. As a result, reliability in the determination result of the angular acceleration determination section 55 is improved, and reliability in the determination result of the abnormality determination section 56 is further improved.

(6) Each of the individual cylinder angular accelerations a1 to a4 is the average of angular accelerations for the corresponding cylinder. Thus, reliability in the determination result of the angular acceleration determination section 55 is further improved.

(7) Each of the individual cylinder angular accelerations a1 to a4 is the average of angular accelerations for the corresponding cylinder, and the compared angular acceleration is the all-cylinder angular acceleration Ea, which is average of the individual cylinder angular accelerations a1 to a4. Thus, for example, even if each cylinder has a different sample number of angular accelerations to calculate the corresponding individual cylinder angular acceleration a1 (a2, a3, a4), its influence on the determination result is limited.

The above-illustrated embodiment may be modified as necessary in the following forms.

In a case in which the individual cylinder angular accelerations a1 to a4 have values based on angular accelerations when the operating state of the engine 10 is the steady state, the embodiment may be modified as long as the individual cylinder angular accelerations a1 to a4 are angular accelerations in the steady state. Each of the individual cylinder angular accelerations a1 to a4 does not necessarily need to be the average of angular accelerations during a predetermined period.

The embodiment may be modified as long as the individual cylinder angular accelerations a1 to a4 are angular accelerations of the crankshaft 28 in the fuel-injecting state. For example, the individual cylinder angular accelerations a1 to a4 may be angular accelerations when the operating state of the engine 10 is an accelerating state.

The all-cylinder angular acceleration Ea does not necessarily need to be the average of the individual cylinder angular accelerations a1 to a4 and may be the average of all angular accelerations used in calculating the individual cylinder angular accelerations a1 to a4.

In the injection time determination process, the embodiment may be modified as long as determination is conducted based on an estimated value Ce and a detected value Cd in the fuel-injecting state, and determination is not limited to comparison between averages. For example, the determination may be conducted based on one estimated value Ce and one detected value.

In injection time determination process, the embodiment may be modified as long as determination is conducted based on the estimated value Ce and the detected value Cd in the fuel-injecting state. The determination may be conducted based on the estimated value Ce and the detected value Cd in a state that the engine 10 is not in the injection stable state.

In non-injection time determination process, the embodiment may be modified as long as determination is conducted based on the detected value Cd in the non-fuel-injecting state. For example, determination may be conducted based on the detected value Cd immediately after the state of the engine 10 has shifted to the non-fuel-injecting state or may be conducted based on the average of detected values Cd.

The engine is not limited to the diesel engine 10. The engine may be a gasoline engine.

The invention claimed is:

1. A device for determining a presence or absence of an abnormality in an engine system, wherein the engine system includes an engine that has a plurality of cylinders and drives a crankshaft, a fuel injection valve that is arranged in each of the cylinders and injects fuel into the cylinder, and a sensor that outputs a detected value of residual oxygen concentration, which is an oxygen concentration in an exhaust passage, and the abnormality includes an abnormality in the sensor, an abnormality in the fuel injection valves, or misfires in the engine, the device comprising:
an estimation section for calculating an estimated value of the residual oxygen concentration based on a target injection amount for the fuel injection valves and an intake air amount of the engine;
a first determination section for determining a relationship between the detected value and the estimated value separately in a non-fuel-injecting state and in a fuel-injecting state, wherein the relationship includes whether the detected value is higher than the estimated value, whether the detected value is lower than the estimated value, and whether the detected value is equal to the estimated value,
a second determination section that obtains, for each cylinder, an angular acceleration of the crankshaft in an expansion stroke of the cylinder in the fuel-injecting state and determines, for each cylinder, a relationship between the corresponding angular acceleration and an average angular acceleration, which is an average of all of the angular accelerations of each cylinder, wherein the relationship includes whether each angular acceleration is higher than the average angular acceleration, whether each angular acceleration is lower than the average angular acceleration, and whether each angular acceleration is equal to the average angular acceleration; and
an abnormality determination section for determining the presence or absence of the abnormality based on a determination result of the first determination section and a determination result of the second determination section.

2. The device according to claim 1, wherein the first determination section obtains the estimated value and the detected value used in the determination in the non-fuel-injecting state in response to a determination that the non-fuel-injecting state has continued for a predetermined period.

3. The device according to claim 1, wherein the first determination section obtains the estimated value and the detected value used in the determination in the fuel-injecting state in response to a determination that a state in which a derivative value of the target injection amount in the fuel-injecting state is less than or equal to a predetermined value has continued for a predetermined period.

4. The device according to claim 3, wherein the estimated value is a first estimated value of a plurality of estimated values, and the detected value is a first detected value of a plurality of detected values, and wherein
the first determination section obtains the plurality of estimated values and the plurality of detected values during a predetermined period after the determination that the state in which the derivative value of the target injection amount is less than or equal to the predetermined value in the fuel-injecting state has continued for the predetermined period, and
the first determination section determines a relationship between the first detected value and the first estimated value based on an average of the plurality of estimated values and an average of the plurality of detected values.

5. The device according to claim 1, wherein the second determination section obtains the angular acceleration when the engine is in a steady state.

6. A device for determining a presence or absence of an abnormality in an engine system, wherein the engine system includes an engine that has a plurality of cylinders and drives a crankshaft, a fuel injection valve that is arranged in each of the cylinders and injects fuel into the cylinder, and a sensor that outputs a detected value of residual oxygen concentration, which is an oxygen concentration in an exhaust passage, and the abnormality includes an abnormality in the sensor, an abnormality in the fuel injection valves, or a misfire in the engine, the device comprising:
an estimation section for calculating an estimated value of the residual oxygen concentration based on a target injection amount for the fuel injection valves and an intake air amount of the engine;
a first determination section for determining a relationship between the detected value and the estimated value separately in a non-fuel-injecting state and in a fuel-injecting state, wherein the relationship includes whether the detected value is higher than the estimated value, whether the detected value is lower than the estimated value, and whether the detected value is equal to the estimated value, a second determination section that obtains, for each cylinder, an angular acceleration of the crankshaft in an expansion stroke of the cylinder in the fuel-injecting state and determines, for each cylinder, a relationship between the corresponding angular acceleration and an average angular acceleration, which is an average of all of the angular accelerations of each cylinder, wherein the relationship includes whether each angular acceleration is higher than the average angular acceleration, whether each angular acceleration is lower than the average angular acceleration, and whether each angular acceleration is equal to the average angular acceleration; and an abnormality determination section for determining the presence or absence of the abnormality based on a determination result of the first determination section and a determination result of the second determination section, wherein the abnormality determination section is configured to determine that a misfire is occurring in a specific cylinder of the plurality of cylinders when the determination result of the first determination section for the non-fuel-injecting state is normal, the determination result of the first determination section for the fuel-injecting state is abnormal in which the detected value is higher than the estimated value, and the determination result of the second determination section is abnormal in which the angular acceleration for the specific cylinder is lower than the average angular acceleration.

7. The device according to claim 6, the abnormality determination section is further configured to:
  determine the presence of the abnormality in the sensor when the determination result of the first determination section for the non-fuel-injecting state is abnormal, the determination result of the first determination section for the fuel-injecting state is abnormal, and the determination result of the second determination section is normal for all of the plurality of cylinders;
  determine the presence of the abnormality in the fuel injection valves for all of the plurality of cylinders when the determination result of the first determination section for the non-fuel-injecting state is normal, the determination result of the first determination section for the fuel-injecting state is abnormal, and the determination result of the second determination section is normal for all of the plurality of cylinders; and
  determine the presence of the abnormality in the fuel injection valves for a specific cylinder of the plurality of cylinders when the determination result of the first determination section for the non-fuel-injecting state is abnormal, the determination result of the first determination section for the fuel-injecting state is abnormal, and the determination result of the second determination section is abnormal for the specific cylinder.

* * * * *